United States Patent
Miao et al.

(10) Patent No.: US 10,348,472 B2
(45) Date of Patent: *Jul. 9, 2019

(54) DETERMINATION OF FEEDBACK TIMING

(71) Applicant: Telefonaktiebolaget LM Ericsson (publ), Stockholm (SE)

(72) Inventors: Qingyu Miao, Beijing (CN); Shaohua Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,789

(22) Filed: Dec. 11, 2017

(65) Prior Publication Data

US 2018/0102891 A1 Apr. 12, 2018

Related U.S. Application Data

(63) Continuation of application No. 15/326,510, filed as application No. PCT/CN2016/091532 on Jul. 25, 2016, now abandoned.

(51) Int. Cl.
*H04L 1/16* (2006.01)
*H04L 1/18* (2006.01)
*H04L 5/00* (2006.01)
*H04W 72/04* (2009.01)

(52) U.S. Cl.
CPC .......... *H04L 5/0053* (2013.01); *H04L 1/1607* (2013.01); *H04L 1/1864* (2013.01); *H04W 72/0413* (2013.01); *H04L 1/1854* (2013.01); *H04L 5/001* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2009/0116439 A1 | 5/2009 | Madan et al. | |
| 2010/0211845 A1* | 8/2010 | Lee | H04L 1/1854 714/749 |
| 2012/0093040 A1 | 4/2012 | Wu et al. | |
| 2017/0332373 A1* | 11/2017 | Patel | H04L 1/1861 |
| 2018/0014301 A1* | 1/2018 | Chen | H04L 1/1812 |

FOREIGN PATENT DOCUMENTS

| | | |
|---|---|---|
| CN | 101651895 A | 2/2010 |
| CN | 101895377 A | 11/2010 |
| CN | 104812007 A | 7/2015 |
| EP | 2373070 A1 | 10/2011 |
| EP | 3206320 A1 | 8/2017 |
| WO | 2016066121 A1 | 5/2016 |

* cited by examiner

*Primary Examiner* — Yaotang Wang
(74) *Attorney, Agent, or Firm* — Murphy, Bilak & Homiller, PLLC

(57) ABSTRACT

Embodiments of the present disclosure relate to a method and device for determining feedback timing. In example embodiments, the first communication device obtains information indicating at least one of a capability, a timing requirement, and a service type of a second communication device. Based on the obtained information, the first communication device determines feedback timing to be used by the second communication device. Then, the first communication device sends an indication of the feedback timing to the second communication device for communication with the second communication device in accordance with the feedback timing.

8 Claims, 5 Drawing Sheets

DETERMINATION OF FEEDBACK TIMING

RELATED APPLICATIONS

This application is a continuation of U.S. application Ser. No. 15/326,510 filed Jan. 16, 2017, which is a U.S. National Phase Application of PCT/CN2016/091532 filed Jul. 25, 2016. The entire contents of the aforementioned applications are incorporated herein by reference.

TECHNICAL FIELD

Embodiments of the present disclosure generally relate to the field of telecommunication, and in particular, to methods and devices for determining feedback timing.

BACKGROUND

With massive growth of the numbers of devices and traffic volume, the fifth generation (5G) wireless communication systems are being developed to enable a networked society, where information can be accessed and data can be shared anywhere and anytime, by anyone with anything. In current standardization work of the 3rd Generation Partnership Project (3GPP), several New Radio (NR) frame structures have been proposed.

Each of the proposed NR frame structures may include a corresponding type of feedback timing. As used herein, the term "feedback timing" refers to timing used for feeding back any suitable data, such as, an acknowledgement (Ack)/negative acknowledgement (Nack), a channel status indicator (CSI), a channel quality indicator (CQI), a rank indicator (RI), a sounding reference signal (SRS), or any other suitable control data. One design concept of the feedback timing in the NR frame structures is to enable an early acknowledgement report (for example, in several microseconds) after the end of downlink data transmission. Early uplink data transmission (for example, in several microseconds) is also enabled after reception of uplink resource assignment.

However, an increasingly wide range of applications may have variable requirements and characteristics. It will be challenging to use a common NR frame structure with fixed feedback timing in a communication network.

SUMMARY

In general, example embodiments of the present disclosure provide methods and devices for determining feedback timing, in particular methods and devices for adapting feedback timing.

In a first aspect, a method implemented in a first communication device is provided. According to the method, the first communication device obtains information indicating at least one of a capability, a timing requirement, and a service type of a second communication device. Based on the obtained information, the first communication device determines feedback timing to be used by the second communication device. Then, the first communication device sends an indication of the feedback timing to the second communication device for communication with the second communication device in accordance with the feedback timing.

In some embodiments, the first communication device may select a frame structure including the feedback timing.

In some embodiments, the first communication device may send an indication of the frame structure to the second communication device.

In some embodiments, the first communication device may communicate data with the second communication device in accordance with the frame structure.

In some embodiments, the first communication device may select the feedback timing based on an association between the feedback timing and the capability, the timing requirement or the service type of the second communication device.

In some embodiments, the first communication device may receive the information from the second communication device.

In some embodiments, the first communication device may send, to the second communication device, a request for the information.

In some embodiments, the first communication device may receive, from the second communication device, information about a processing time of the second communication device indicating the capability of the second communication device.

In some embodiments, the first communication device may receive, from the second communication device, the information about the processing time of the second communication device in a communication configuration.

In some embodiments, the first communication device may receive, from the second communication device, the information indicating the timing requirement of the second communication device associated with a communication configuration.

In some embodiments, the first communication device may receive, from the second communication device, the information indicating the timing requirement of the second communication device associated with a service type.

In some embodiments, the first communication device may obtain a propagation time of data associated with the second communication device, and determine the feedback timing further based on the obtained propagation time.

In some embodiments, the first communication device may select, based on the obtained information, the feedback timing from a set of feedback timing associated with communication configurations.

In some embodiments, the first communication device may send, to the second communication device, an indication of one of the communication configurations associated with the feedback timing.

In some embodiments, the first communication device may send, to the second communication device, an association between the one of the communication configurations and the feedback timing.

In a second aspect, a method implemented in a second communication device is provided. The method comprises determining information indicating at least one of a capability, a timing requirement, and a service type of the second communication device; sending the information to a first communication device; and receiving an indication of feedback timing from the first communication device for communication with the first communication device in accordance with the feedback timing.

In a third aspect, a communication device, suitable to function as a first communication device in the sense explained as above, is provided. The communication device comprises: a first obtaining unit configured to obtain information indicating at least one of a capability, a timing requirement, and a service type of a further communication device; a first determining unit configured to determine, based on the obtained information, feedback timing to be used by the further communication device; and a first sending unit configured to send an indication of the feedback timing to the further communication device for communication with the further communication device in accordance with the feedback timing.

In a fourth aspect, a communication device, suitable to function as a first communication device in the sense explained as above, is provided. The communication device comprises: a second determining unit configured to determine information indicating at least one of a capability, a timing requirement, and a service type of the communication device; a second sending unit configured to send the information to a further communication device; and a receiving unit configured to an indication of feedback timing from the further communication device for communication with the further communication device in accordance with the feedback timing.

In a fifth aspect, there is provided an apparatus at a first communication device. The apparatus comprises at least one processor and a memory. The memory contains instructions executable by the at least one processor, whereby the apparatus is operative to perform the method according to the first aspect.

In an sixth aspect, there is provided an apparatus at a second communication device. The apparatus comprises at least one processor and a memory. The memory contains instructions executable by the at least one processor whereby the apparatus is operative to perform the method according to the second aspect.

In a seventh aspect, there is provided a computer program and a computer program product that is tangibly stored on a computer readable storage medium. Each of the computer program and the computer program product includes instructions which, when executed on at least one processor, cause the at least one processor to carry out the method according to the first or second aspect.

Through the following description, it will be appreciated that according to embodiments of the present disclosure, the feedback timing to be used by a communication device may be determined by a further communication device in association with at least one of a capability, a timing requirement, a service type of the communication device. In this way, individual communication devices may use the respective feedback timing for communication, which is more efficient and flexible It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure with reference to the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
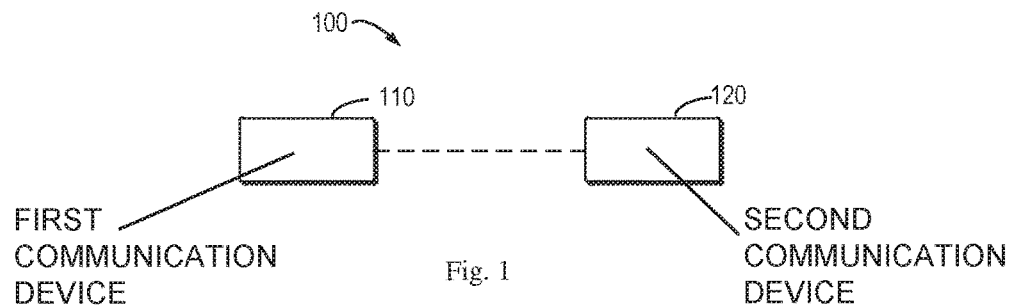
FIG. 1 is a block diagram of an example environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skill in the art to which this disclosure belongs.

As used herein, the term "communication device" refers to any device having wireless or wired communication capabilities including devices at both the network side and the terminal side. For example, the communication device may include a base station, a relay, a terminal device, and the like.

As used herein, the term "base station" (BS) refers to a device which is capable of providing or hosting a cell or coverage where terminal devices can communicate. Examples of a BS include, but are not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like.

As used herein, the term "terminal device" or "user equipment" refers to any end device having wireless communication capabilities, including, but not limited to, mobile phones, cellular phones, smart phones, personal digital assistants (PDAs), portable computers, image capture devices such as digital cameras, gaming devices, music storage and playback appliances, any portable units or terminals that have wireless communication capabilities, or Internet appliances enabling wireless Internet access and browsing or the like.

As used herein, the term "relay" refers to a device which is capable of retransmit or forward data between two communication devices, for example, between the BS and the terminal device so as to increase transmission distances and enlarge the coverage of a communication network.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As described above, in current discussions for the NR frame structures in the 3GPP, different mechanisms/configurations are proposed. In these configurations (or mechanisms), each of the proposed NR frame structures may include a corresponding type of feedback timing. One design object of such feedback timing is to enable an early acknowledgement report and early uplink data transmission.

However, as described above, an increasingly wide range of applications may have variable requirements and characteristics. Furthermore, there may be a huge number of different types of communication devices in a communication network, which have different hardware capabilities, utilize different receiving algorithms, and use different services with different timing requirements. Thus, it will be challenging in the communication network to have a common NR frame structure with fixed feedback timing. In addition, for the purpose of backward compatibility, legacy configurations (or mechanisms) of legacy communication networks may also be considered. In this case, it would be advantageous to design other configurations in addition to the NR frame structures with the fast/short acknowledgement.

In order to solve the above and other potential problems, embodiments of the present disclosure allow a communication device (referred to as a "first communication device") to determine feedback timing to be used by a further communication device (referred to as a "second communication device") based on information indicating at least one of a capability, a timing requirement, and a service type of the second communication device. In this way, the second communication device may use the feedback timing associated with its capability, timing requirement, or service type to communicate with the first communication device.

FIG. 1 shows an example environment 100 in which embodiments of the present disclosure can be implemented. The environment 100, which is a part of a communication network, includes a first communication device 110 and a second communication device 120. It is to be understood that although two communication devices 110 and 120 are shown, this is only for the purpose of illustration without suggesting any limitations as to the scope of the present disclosure. The environment 100 may include any suitable number of communication devices adapted for implementing embodiments of the present disclosure.

According to embodiments of the present disclosure, any suitable implementation of the first and second communication devices 110 and 120 may be possible. In some embodiments, the first communication device 110 may be implemented as a base station (BS), and the second communication 120 may be implemented as a terminal device. In some embodiments, the environment 100 may be a part of a relay communication network. Furthermore, the first communication device 110 may be a BS, and the second communication device 120 may be a relay. In some other embodiments, the first and second communication devices 110 and 120 may be both implemented as terminal devices in device-to-device (D2D) communications, which may be alternatively referred to as sidelink, or vehicle to everything (V2X).

The first and second communication devices 110 and 120 may communicate with each other, as indicated by the dashed lines. The communications may conform to any suitable standard including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but are not limited to, the first generation (1G), the second generation (2G), 2.5G, 2.75G, the third generation (3G), the fourth generation (4G), 4.5G, the fifth generation (5G) communication protocols.

Figure 2:
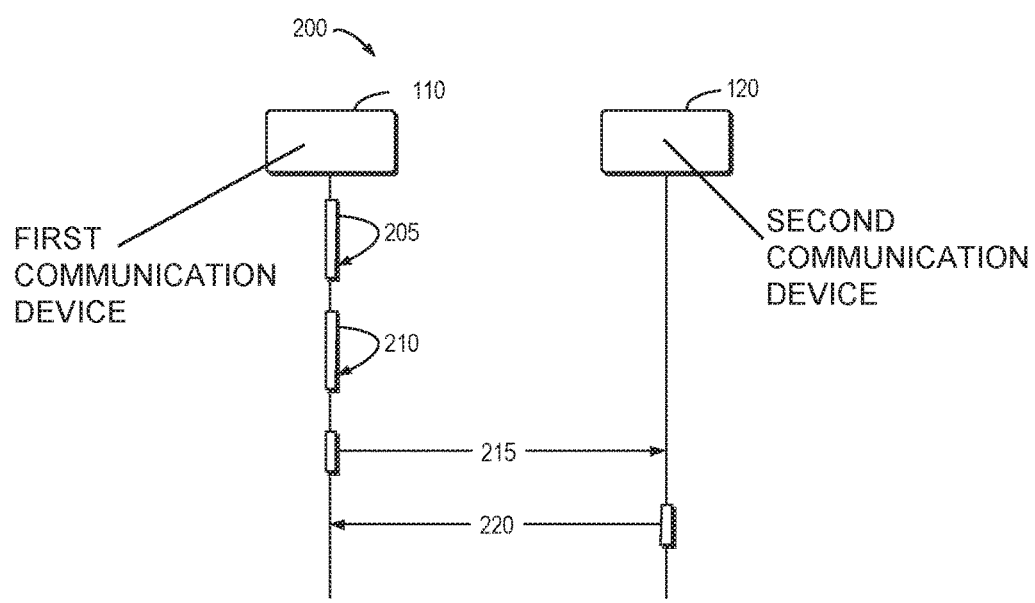
FIG. 2 is a flowchart illustrating the determination of the feedback timing according to some embodiments of the present disclosure.

As described above, embodiments of the present disclosure provide the determination of the feedback timing by the first communication device 110 for the second communication device 120 based on the information indicating the capability, the timing requirement, or the service type of the second communication device 120, the mechanism of which is illustrated in a high-level flowchart as shown in FIG. 2. As shown, the first communication device 110 obtains (block 205) the information indicating at least one of the capability, the timing requirement, or the service type of the second communication device 120. Based on the obtained information, the first communication device 110 determines (block 210) the feedback timing to be used by the second communication device 120. Then, the first communication device 110 sends (block 215) an indication of the feedback timing to the second communication device. After receiving the indication of the feedback timing, the second communication device 120 communicates (block 220) with the first communication device 110 in accordance with the feedback timing.

It can be seen that in accordance with embodiments of the present disclosure, the feedback timing of a communication device may be determined in association with a capability, a timing requirement, or a service type of the communication device. In this way, delay requirements of individual communication devices may be considered for providing respective feedback timing. Compared with fixed feedback timing used in a whole communication network, the respective feedback timing determined for individual communication devices are more efficient and flexible. Some example embodiments will now be described in detail.

Figure 3:
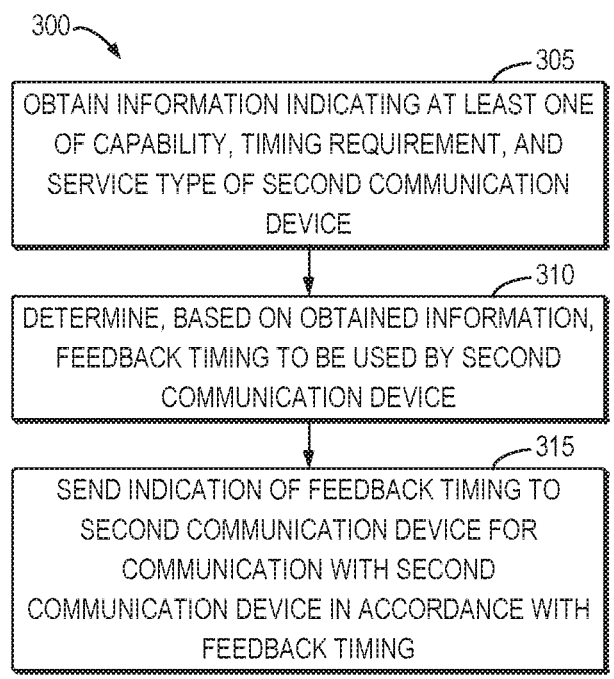
FIG. 3 is a flowchart of a method in accordance with some embodiments of the present disclosure.

FIG. 3 shows a flowchart of an example method 300 in accordance with some embodiments of the present disclosure. The method 300 can be implemented, for example, in the first communication device 110 for determining the feedback timing of the second communication device 120 as shown in FIGS. 1 and 2. For the purpose of discussion, the method 300 will be described with reference to FIGS. 1 and 2.

As shown, in block 305, the first communication device 110 obtains information indicating at least one of a capability, a timing requirement, and a service type of the second communication device 120. According to embodiments of the present disclosure, any suitable type of information may be used to enables the indication.

In some embodiments where the information indicates the capability of the second communication device 120, the information may be a device type of the second communication device 120. The device type may reflect a complexity associated with the capability of the second communication device 120. For example, the device type may specify whether the second communication device 120 is a terminal device or a relay. The device type may also specify whether the second communication device 120 is a normal terminal device, a massive machine type communication (M-MTC), or critical MTC (C-MTC). Furthermore, the device type may specify a user equipment (UE) category. These device types may influence a time duration for which the second communication device 120 receives and processes data from the first communication device 110 and depending on the success, provides a feedback. Accordingly, based on the device type of the second communication device 120, the first communication device 110 may determine the feedback timing for the second communication device 120, as will be described in the following paragraphs. It is to be understood that other information that indicates the complexity of the second communication device 120 may be possible.

In some other embodiments where the information indicates the capability of the second communication device 120, the information may be information about a processing time of the second communication device 120. The processing time may be implemented as a processing time of the second communication device 120 in any representative operation, which may enable the indication of the capability (for example, a processing capability) of the second communication device 120.

As an example, the processing time may be a processing time of the second communication device 120 when operating with a specific communication configuration. In the context of present disclosure, the communication configuration may be any suitable configuration that can be used by a device for communication. For example, the communication configuration may include a transmission parameter, such as a transmission block (TB) size, a multiple input multiple output (MIMO) layer, a modulation and coding scheme (MCS), a carrier aggregation (CA) configuration, a physical resource block (PRB), a bandwidth, a transmission mode, a coding scheme, and the like. Additionally or alternatively, the communication configuration may also include a receiver type of the second communication device 120. Examples of the receiver type may include, but be not limited to, a maximal ratio combining (MRC) receiver, an interference rejection combining (IRC) receiver, a network-assisted interference cancellation and suppression (NAICs) receiver, an EMMSE (enhanced minimum mean square error)-IRC receiver, and the like. Based on these processing times of the second communication device 120 in different communication configurations, the first communication device 110 may determine the corresponding feedback timing, as will be described in the following paragraphs. As another example, the processing time may be a general processing time of the second communication device 120 which is applicable to various communication configurations.

According to embodiments of the present invention, the information may also indicate the service type of the second communication device 120. The service type may be the type of a service to be provided to or by the second communication device 120. Different service types may have different timing requirements. For example, some service types may be delay-critical, and some service types may endure a longer delay. Thereby, the first communication device 110 may determine the feedback timing for the second communication device 120 using a specific service type. The determination of the feedback timing by the first communication device 110 will be described in details in the following paragraphs.

Additionally or alternatively, according to embodiments of the present invention, the information may also indicate the timing requirement of the second communication device 120. In some embodiments, the timing requirement may be associated with a communication configuration. When the second communication device 120 operates with different communication configurations, the second communication device 120 may have different processing times and, accordingly, different timing requirements. With these timing requirements, the first communication device 110 may determine the corresponding feedback timing for the second communication device 120. In some other embodiments, the timing requirement may be associated with a service type. As described above, different service types may have different timing requirements. Thereby, the first communication device 110 may determine the corresponding feedback timing based on the timing requirements associated with the service type of the second communication device 120.

The information indicating the capability, the timing requirement, or the service type of the second communication device 120 may be obtained by the first communication device 110 in any suitable way. In some embodiments, the first communication device 110 may receive the information from the second communication device 120. For example, the first communication device 110 may receive the device type, the processing time, the service type, or the timing requirement from the second communication device 120. Optionally, the receiving of the first communication device 110 may be triggered by a request for the information sent from the first communication device 110 to the second communication device 120. For example, before the feedback timing for the second communication device 120 is determined, the first communication device 110 may send a query for the capability of the second communication device 120. As a response, the second communication device 120 may send to the first communication device 110 the information indicating its capability. The operations of the second communication device 120 may be detailed in the following paragraphs.

It is to be understood that other methods for obtaining the information are possible. In some embodiments, the first communication device 110 may determine the information by itself. For example, the first communication device 110 may determine the service type to be provided to or by the second communication device 120.

The information indicating the capability, the timing requirement, or the service type of the second communication device 120 may be implemented in any suitable form. In some embodiments, the information may be recorded in a table. Accordingly, the first communication device 110 may obtain the table. An example of the table is shown as below.

TABLE 1

|  | Set 1 | Set 2 |
| --- | --- | --- |
| TB size | 712 bits | 1480 bits |
| MIMO Layer | 4 | 8 |
| MCS | 16QAM | 64QAM |
| PRBs | 1 | 2 |
| Transmission Mode | TM2 | TM10 |
| Receiver Type | IRC | NAICs |
| ... | ... | ... |
| Timing Requirement | 1 TTI | 2 TTIs |

In this example, the table (for example. Table 1) shows an association between the timing requirement and the communication configuration. As shown, the TB sizes varies between two sets, such as Set 1 and Set 2, where Set 1 has a value of 712 bits and Set 2 has a value of 1480 bits. If the TB size is equal or less than 712 bits, the timing requirement of the second communication device 120 is 1 transmission time interval (TTI), which may be 1 ms or several microseconds. Otherwise, the timing requirement is 2 TTIs. Table 1 also shows two sets of transmission modes including TM2 and TM10, as defined in 3GPP specifications. As shown, if the transmission mode is TM2, the timing requirement of the second communication device 120 is 1 TTI. If the transmission mode is TM10, the timing requirement is 2 TTIs. Furthermore, as shown, Table 1 also include the timing requirements associated with the sets of other communication configurations, such as, the MIMO layer, the MCS, the PRBs, the receiver type, and the like.

It is to be understood that Table 1 is only for the purpose of illustration with suggesting any limitation. Other implementations of the table may be possible. In some embodiments, the table may also include association between the timing requirements and the service types. Alternatively or additionally, the table may include, for each set, the capability of the second communication device 120.

After the first communication device 110 obtains the information in block 305, the method 300 proceeds to block 310, where the first communication device 110 determines, based on the obtained information, the feedback timing to be used by the second communication device 120. Any suitable method may be used for the determination. For example, the feedback timing may be selected based on an association between the feedback timing and the capability, the timing requirement, or the service type of the second communication device 120.

For example, in the embodiments where the information indicates the capability is received, the first communication device 110 may assign earlier (faster/shorter) feedback timing to the second communication device 120 having a better capability, a lower processing complexity, or less processing time, and vice versa. Specifically, if the second communication device 120 is a relay rather than a terminal device, the first communication device 110 may assign the earlier feedback timing to the second communication device 120. If the second communication device 120 is a C-MTC rather than a M-MTC, the second communication device 120 is more delay-critical. In this case, the first communication device 110 may determine the earlier feedback timing.

In the embodiments where the information indicates the service type is received, for example, the first communication device 110 may determine that the second device 120, which is to be provided a more delay-critical service, will use earlier feedback timing, and vice versa. Specifically, if the second communication device 120 is to initiate a connection, which is more delay-critical, the earlier feedback timing may be determined. If the second communication device 120 is to use a data sharing service, which may endure a longer latency, the later feedback timing may be determined. As another example, the first communication device 110 may determine the earlier feedback timing if the type of service to be provided by the second communication device 120 is more delay-critical. Specifically, if the second communication device 120 is to provide the backhaul for other devices as a relay service, the first communication device 120 may determine that the feedback timing may be earlier so as to reduce latency in a backhaul link.

Alternatively or additionally, in the embodiments where the timing requirement of the second communication device 120 is obtained, the first communication device 110 may assign later (slower/longer) feedback timing to the second communication device 120 with a longer (later/slower) timing requirement. For example, the second communication device 120 may report a longer timing requirement in the case that it has a worse capability. Accordingly, the first communication device 110 may determine the later feedback timing.

In addition to the information indicating the capability, the timing requirement, or the service type, other factors may be considered for the determination of the feedback timing for the second communication device 120. In some embodiments, the determination may be further based on an association of the feedback timing with a frame structure. In the context of the present disclosure, the frame structure refers to uplink and downlink configurations of a radio frame, e.g., comprising a number of subframes and respective uses of these, which may be used at both communication sides. For example, a set of frame structures may be predefined, each including a type of feedback timing. The first communication device 110 may select, based on the obtained information, the feedback timing from the set of feedback timing included in the predefined frame structures.

Figure 4:
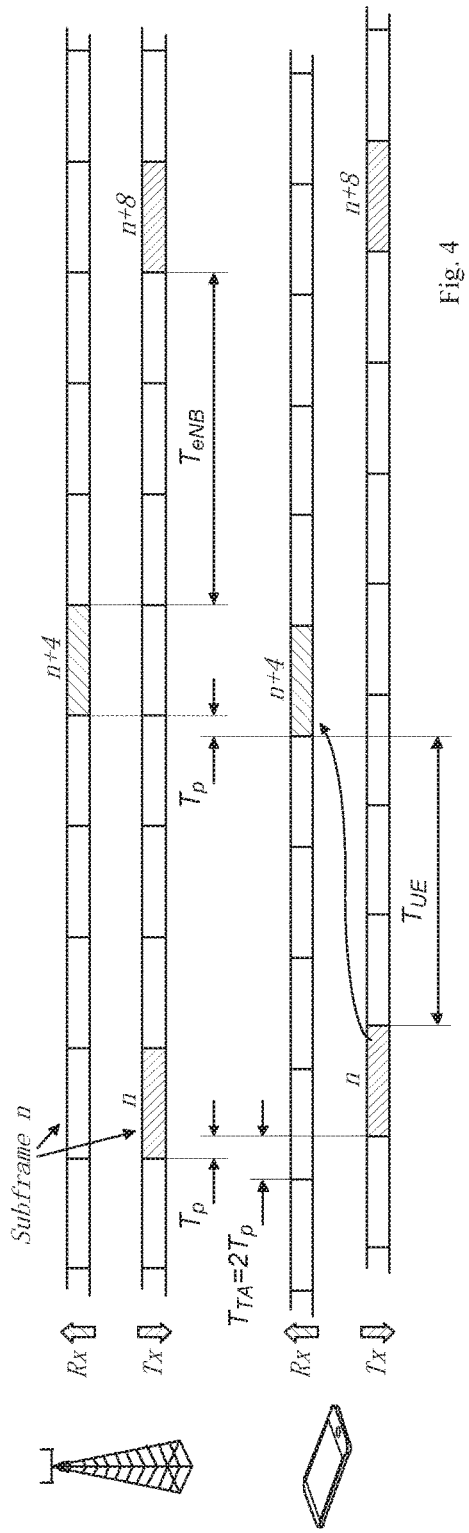
FIG. 4 illustrates example feedback timing in LTE frequency-division duplex (FDD) in accordance with some embodiments of the present disclosure.

Examples in this respect will be described below with reference to FIGS. 4 and 5. FIG. 4 schematically depicts an example scenario in LTE frequency-division duplex (FDD). As shown, in this example, the second communication 120, acting as a terminal device, is required to transmit Automatic Repeat Request (ARQ) or hybrid-ARQ acknowledgment related to a downlink subframe n in an uplink subframe n+4. In FIG. 4, $T_p$ denotes a propagation delay from the first communication device 110, acting as an access node, to the second communication device 120; $T_{T4}$ denotes an offset separating the start of an uplink subframe relative to the start of a corresponding downlink subframe at the terminal side; $T_{UE}$ is the processing time available to the terminal; and $T_{eNB}$ is a processing time available to the first communication device 110. This allows the second communication device 120 between 2 and 3 ms for decoding the transport block and preparing the uplink transmission that carries the ACK/NACK. The exact time depends on timing advance settings.

Figure 5:
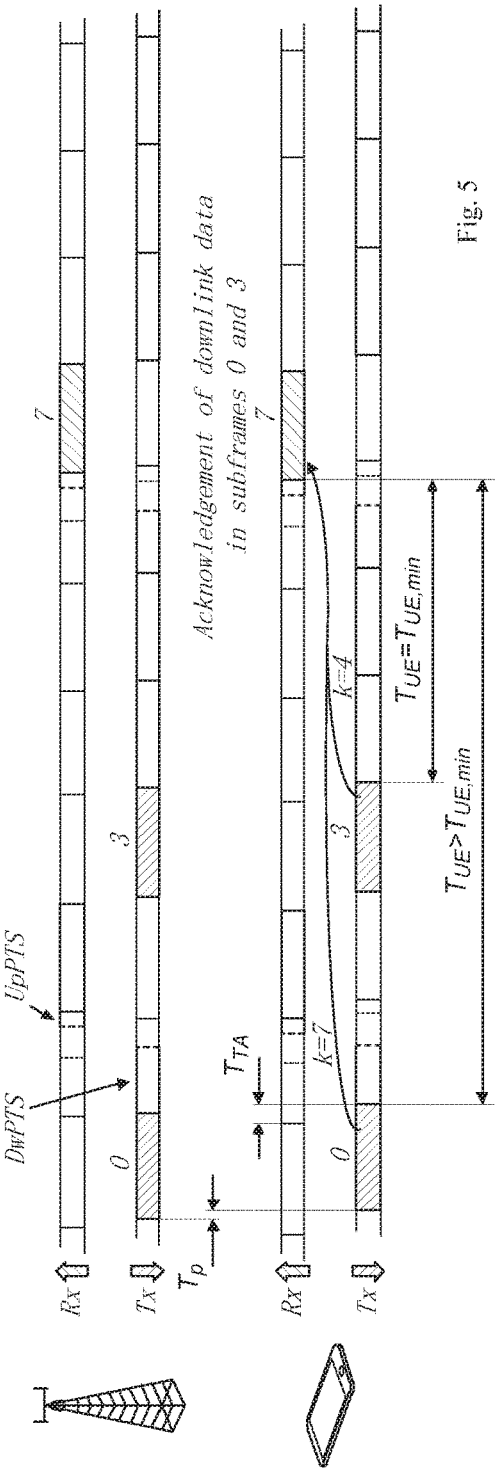
FIG. 5 illustrates example feedback timing in time-division duplex (TDD) in accordance with some embodiments of the present disclosure.

FIG. 5 illustrates a timing relationship between downlink data and uplink hybrid-ARQ acknowledgement for time-division duplex (TDD). In fact, the acknowledgement transmitted in uplink subframe 7 is bundled, and will be positively valued only if both of the downlink transmissions in subframe 0 and 3 are correctly decoded.

In addition, in some other embodiments, the determination of the feedback timing may be further based on system configurations. For example, if a system bandwidth is 10 MHz and the bandwidth of 2 MHz is allocated to the second communication device 120, the feedback timing may be determined by the first communication device 110 based on the timing requirement of the second communication device 120 operating in the bandwidth of 2 MHz.

As another example, the first communication device 110 may decide, based on the system configurations, a communication configuration for the second communication device 120, first. Given the communication configuration, the feedback timing may be further determined based on an association of the feedback timing and the communication configuration. Table 1 may also be referenced. If the configured TB size is equal or less than 712 bits, 1 or more TTI may be selected as the feedback timing. Otherwise, the feedback timing is 2 or more TTIs. Additionally or alternatively, if the transmission mode is TM2, 1 TTI or more may be selected as the feedback timing; otherwise, the feedback timing is 2 TTIs or more. Likewise, the feedback timing may be determined in association with the sets of other communication configurations, such as the MIMO layers, the MCSs, the PRBs, the receiver types, and the like.

Optionally, the first communication device 110 may determine the feedback timing further considering a propagation time of data associated with the second communication device 120. For example, if the propagation time of data between the first communication device 110 and the second communication device 120 is longer, the first communication device 110 may determine that the feedback timing is later (slower/longer). The propagation time may be measured by the first communication device 110 by any suitable measurement method. Alternatively, the first communication device 110 may receive the propagation time from the second communication device 120 which performs the measurement of the propagation time.

Still with reference to FIG. 3, after the feedback timing is determined for the second communication device 120, in block 315, the first communication device 110 sends an indication of the feedback timing to the second communication device 120. As a result, the first communication device 110 may communicate with the second communication device 120 in accordance with the feedback timing. The indication of the feedback timing may be implemented as any suitable explicit or implicit indication of the feedback timing.

In some embodiments, the indication may be the feedback timing per se. In some other embodiments, the indication may be a frame structure associated with the feedback timing. As described above, a set of frame structures may be predefined, and each frame structure includes a type of feedback timing. After the feedback timing is selected from the set of feedback timing included in the predefined frame structures, the associated frame structure is also selected. Accordingly, the first communication device 110 may send to the second communication device 120 an indication of the frame structure as the indication of the selected feedback timing. After the second communication device 120 is informed of the frame structure, the second communication device 120 may determine the feedback timing based on the association between the feedback timing and the frame structure, as will be described in detail in the following paragraphs. After the frame structure is indicated to the second communication device 120, in some embodiments, the first communication device 110 may also communication with the second communication device 120 in accordance with the frame structure.

The use of a frame structure, which is not predefined but configured dynamically, is also possible. In this case, the first communication device 110 may configure, based on the information obtained in block 305, a frame structure including specific feedback timing. Then, the first communication device 110 may send to the second communication device 120 the indication of the frame structure for indicating both the feedback timing and the frame structure to the second communication device 120.

In addition to the feedback timing per se and the associated frame structure, in some embodiments, the indication may be a communication configuration associated with the feedback timing. As described above, when operating with different communication configurations, the second communication device 120 may have different timing requirements. When the communication configuration to be used by the second communication device 120 is decided, the feedback timing may be determined by the first communication device 110 based on the corresponding timing requirement, accordingly. In this case, the first communication device 110 may send to the second communication device 120 an indication of the communication configuration. In this way, the feedback timing is implicitly informed by the communication configuration.

In some embodiments, in addition to the communication configuration, the first communication 110 may send to the second communication device 120 an association of the feedback timing and the communication configuration. Thus, the second communication device 120 may determine the feedback timing based on the indication of the communication configuration received from the first communication device 110. The association of the feedback timing and the communication configuration may be semi-statically or dynamically configured. Accordingly, the first communication device 110 may semi-statically or dynamically inform the second communication device 120 of the association. The association of the feedback timing and the communication configuration may also be predefined.

Figure 6:
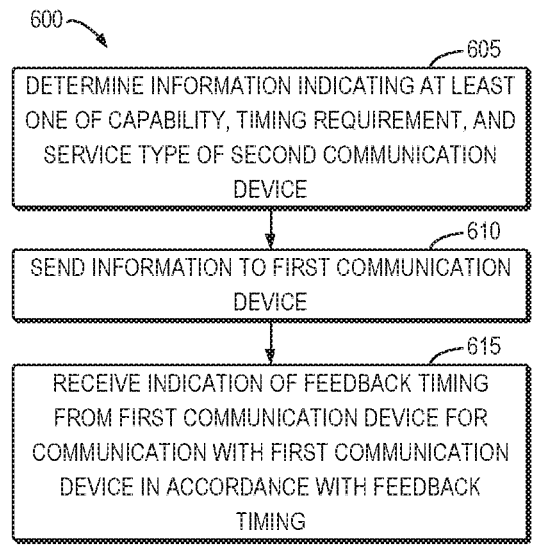
FIG. 6 is a flowchart of a method in accordance with some other embodiments of the present disclosure.

FIG. 6 shows a flowchart of an example method 600 in accordance with some other embodiments of the present disclosure. The method 600 can be implemented, for example, in the second communication device 120 as shown in FIGS. 1 and 2. For the purpose of discussion, the method 600 will be described with reference to FIGS. 1 and 2.

As shown, in block 605, the second communication device 120 determines information indicating at least one of a capability, a timing requirement, and a service type of the second communication device 120. As described above, the information may be implemented as any suitable type of information.

For example, in the embodiments where the information indicates the capability, the second communication may send an indication of its capability to the first communication device 110. Specifically, the second communication device 120 may report the device type, or the processing time associated with its capability to the first communication device 110. Likewise, the processing time may be the processing time of the second communication device 120 operating with a specific communication configuration.

In the embodiments where the information indicates the service type, the second communication device 120 may send to the first communication device 110 the service to be provided to or by itself. Additionally or alternatively, in the embodiment where the information indicates the timing requirement, the second communication device 120 may determine the timing requirements based on the communication configurations and/or service types. For example, the second communication device 120 may measure a processing time when operating in a specific communication configuration. Further, the second communication device 120 may determine the timing requirement based on the measured processing time. Then, the second communication device 120 may send the information indicating the timing requirements to the first communication device 110. As another example, the second communication device 120 (for example, a terminal device) may configure the timing requirement by itself. For example, when the second communication device 120 is in power saving mode, the timing requirement may be longer, and when the second communication device 120 is in non-power saving mode, the timing requirement may be shorter.

As described above, the information may be implemented in any suitable form. Likewise, the information may be recorded by the second communication device 120 in a table, for example, in Table 1 as shown above. In the embodiments where Table 1 is used, the second communication device 120 may determine its timing requirements when operating in a plurality of communication configurations, such as, the TB sizes. MIMO layers. MCSs. PRBs, transmission modes, receiver types, and the like.

After the information indicating the capability, timing requirement, service type of the second communication device 120 is determined, the method 600 proceeds to block 610, where the second communication device 120 sends the information to the first communication device 110. In this way, the first communication device 110 may determine, based on the information, the feedback timing to be used by the second communication device 120. Likewise, in the embodiments where the table is used to record the information, the second communication device 120 may send the table to the first communication device 110. In some embodiments, as described above, the sending may be triggered by a request for the information sent from the first communication device 110.

In some embodiments, in addition to the above information, the second communication device 120 may measure and send to the first communication device 110 a propagation time of data between the second communication device 120 and the first communication device 110. Any suitable method may be used for the measurement. Thereby, the first communication device 110 may determine the corresponding feedback timing further based on the propagation time.

After the information is sent in block 610, the second communication device 120 receives from the first communication device 110 an indication of feedback timing to be used by itself, in block 615. Thus, the second communication device 120 may communicate with the first communication device 110 in accordance with the feedback timing.

As described above, the indication of the feedback timing may be implemented as any suitable explicit or implicit indication of the feedback timing. For example, the indication may be the feedback timing per se. As another example, an indication of a frame structure or a communication configuration associated with the feedback timing may be used for indicating the feedback timing. Optionally, the association between the feedback timing and the communication configuration may also be received by the second communication device 120. Accordingly, after the indication of the frame structure or communication configuration is received, the second communication device 120 may determine the feedback timing based on the association between the feedback timing and the frame structure or communication configuration.

By way of example, as described above, a set of frame structures may be predefined, and each predefined frame structure includes a specific type of feedback timing. In this case, the second communication device 120 may be aware of the feedback timing based on the predefined inclusion of the feedback timing in the frame structures. In the case that the indication of the frame structure is received, in some embodiments, the second communication device 120 may communicate with the first communication device 110 in accordance with the indicated frame structure.

Additionally or alternatively, if the association between the feedback timing and communication configurations is determined in advance, the second communication device 120 may determine the feedback timing based on the associated communication configurations after receiving the indication of the communication configuration. Likewise, the second communication device 120 may also communicate with the first communication device 110 with the indicated communication configuration.

It will be appreciated that all operations and features described above with reference to the method 300 as shown in FIG. 3 are likewise applicable to the method 600. For the purpose of simplification, the details will be omitted.

Figure 7:
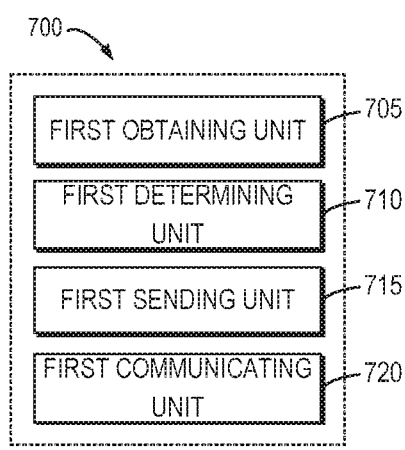
FIG. 7 is a block diagram of a communication device in accordance with some embodiments of the present disclosure.

FIG. 7 shows a block diagram of a communication device 700 in accordance with some embodiments of the present disclosure. The communication device 700 can be considered an example implementation of the first communication device 110 as shown in FIGS. 1 and 2.

As shown, the communication device 700 comprises: a first obtaining unit 705 configured to obtain information indicating at least one of a capability, a timing requirement, and a service type of a further communication device (referred to as the second communication device in some paragraphs of this disclosure); a first determining unit 710 configured to determine, based on the obtained information, feedback timing to be used by the further communication device; and a first sending unit 715 configured to send an indication of the feedback timing to the further communication device for communication with the further communication device in accordance with the feedback timing.

In some embodiments, the first determining unit 710 may be further configured to select a frame structure including the feedback timing. In some embodiments, the first sending unit 715 may be further configured to send an indication of the frame structure to the further communication device. In some embodiments, the communication device 700 may further comprise: a first communicating unit 720 configured to communicate data with the further communication device in accordance with the frame structure.

In some embodiments, the first determining unit 710 may be further configured to select the feedback timing based on an association between the feedback timing and the capability, the timing requirement or the service type of the further communication device.

In some embodiments, the first obtaining unit 705 is further configured to receive the information from the further communication device. In some embodiments, the first sending unit 715 may be further configured to send, to the further communication device, a request for the information.

In some embodiments, the first obtaining unit 705 may be further configured to receive, from the further communication device, a processing time of the further communication device indicating the capability of the further communication device. In some embodiments, the first obtaining unit 705 may be further configured to receive, from the further communication device, the processing time of the further communication device in a communication configuration.

In some embodiments, the first obtaining unit 705 may be further configured to receive, from the further communication device, the information indicating the timing requirement of the further communication device associated with a communication configuration. In some embodiments, the first obtaining unit 705 may be further configured to receive, from the further communication device, the information indicating the timing requirement of the further communication device associated with a service type.

In some embodiments, the communication device 700 may further comprise: a second obtaining unit configured to obtain a propagation time of data associated with the further communication device. In these embodiments, the first determining unit 710 may be further configured to determine the feedback timing further based on the obtained propagation time.

In some embodiments, the first determining unit 710 may be further configured to select, based on the obtained information, the feedback timing from a set of feedback timing associated with communication configurations. In some embodiments, the first sending unit 715 may be further configured to send, to the further communication device, an indication of one of the communication configurations associated with the feedback timing.

Figure 8:
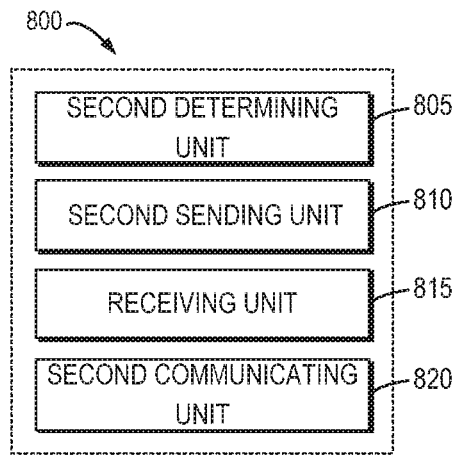
FIG. 8 is a block diagram of a communication device in accordance with some other embodiments of the present disclosure.

FIG. 8 shows a block diagram of a communication device 800 in accordance with some other embodiments of the present disclosure. The communication device 800 can be considered an example implementation of the second communication device 120 as shown in FIGS. 1 and 2.

As shown, the communication device 800 comprises: a second determining unit 805 configured to determine information indicating at least one of a capability, a timing requirement, and a service type of the communication device; a second sending unit 810 configured to send the information to a further communication device (referred to as the first communication device in some paragraphs of this disclosure); and a receiving unit 815 configured to an indication of feedback timing from the further communication device for communication with the further communication device in accordance with the feedback timing.

In some embodiments, the receiving unit 815 may be further configured to receive, from the further communication device, a request for the information.

In some embodiments, the receiving unit 815 may be further configured to receive, from the further communication device, an indication of a frame structure including the feedback timing. In some embodiments, the communication device 800 may further comprise: a second communicating unit 820 configured to communicate data with the further communication device in accordance with the frame structure.

In some embodiments, the second determining unit 805 may be further configured to determine a processing time of the communication device indicating the capability of the communication device. In some embodiments, the second determining unit 805 may be further configured to determine the processing time of the communication device in a communication configuration.

In some embodiments, the second determining unit 805 may be further configured to determine the timing requirement of the communication device associated with a communication configuration. In some embodiments, the second determining unit 805 may be further configured to determine the timing requirement of the communication device associated with a service type.

In some embodiments, the communication device 800 may further comprise: a third determining unit configured to determine a propagation time of data associated with the communication device. In these embodiments, the second sending unit 810 may be further configured to send the propagation time to the further communication device.

In some embodiments, the receiving unit 815 may be further configured to receive, from the further communication device, an indication of one of communication configurations associated with the feedback timing.

It should be appreciated that units included in the communication devices 700 and 800 correspond to the blocks of the methods 300 and 600. Therefore, all operations and features described above with reference to FIGS. 1 to 6 are likewise applicable to the units included in the communication devices 700 and 800 and have similar effects. For the purpose of simplification, the details will be omitted.

The units included in the communication devices 700 and 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the communication devices 700 and 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs). System-on-a-chip systems (SOCs), Complex Programmable Logic Devices (CPLDs), and the like.

Figure 9:
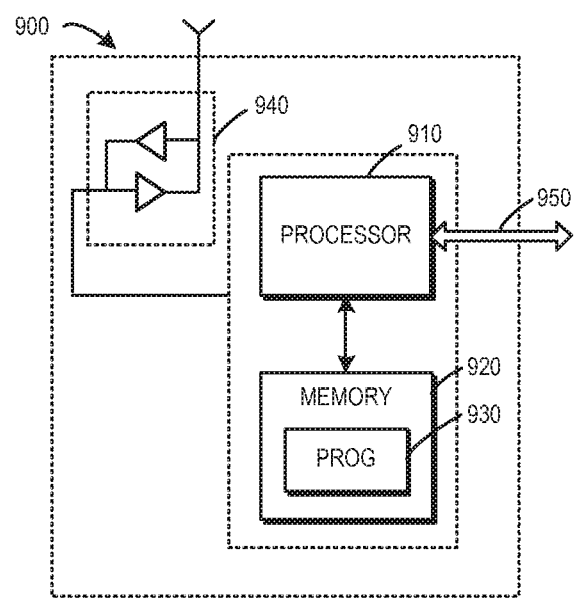
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the first and second communication devices 110 and 120 as shown in FIGS. 1 and 2. Accordingly, the device 900 can carry the methods implemented in the first and second communication devices 110 and 120, respectively.

As shown, the device 900 includes a processor 910, a memory 920 coupled to the processor 910, a suitable transmitter (TX) and receiver (RX) 940 coupled to the processor 910, and a communication interface 950 coupled to the processor 910. The memory 910 stores at least a part of a program 930. The TX/RX 940 is for bidirectional wireless communications. The TX/RX 940 has at least one antenna to facilitate communication, though in practice an Access Node mentioned in this application may have several ones. The communication interface 950 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 910 may form processing means adapted to implement various embodiments of the present disclosure.

The memory 910 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one memory 910 is shown in the device 900, there may be several physically distinct memory modules in the device 900. The processor 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or functional actions, it is to be understood that the present disclosure defined in the appended claims is not necessarily limited to the specific features or actions described above. Rather, the specific features and acts described above are disclosed as example forms of implementing the claims.

What is claimed is:

1. A method implemented by a first communication device operating in a wireless communication network, the method comprising:
 receiving capability information indicating a processing time of a second communication device, the processing time bearing on the generation of feedback at the second communication device for transmission to the first communication device;
 selecting a frame structure to be used for communicating with the second communication device, in dependence on the processing time of the second communication device, the selected frame structure having a corresponding feedback timing requirement that is compatible with the processing time of the second communication device, and in further dependence on a timing advance with respect to the second communication device, such that the processing time plus the timing advance do not violate the corresponding feedback timing requirement of the selected frame structure;
 transmitting an indication of the selected frame structure to the second communication device; and
 communicating with the second communication device in accordance with the selected frame structure, including receiving feedback from the second communication device according to the selected frame structure.

2. The method of claim 1, further comprising selecting the frame structure in further dependence on a communication configuration used for communications between the first communication device and the second communication device.

3. The method of claim 1, wherein the first communication device is a base station of the wireless communication network and wherein the second communication device is a user equipment.

4. A first communication device configured for operation in a wireless communication network, the first communication device comprising:
 a transceiver; and
 processing circuitry configured to:
  receive capability information indicating a processing time of a second communication device, the processing time bearing on the generation of feedback at the second communication device for transmission to the first communication device;
  select a frame structure to be used for communicating with the second communication device, in dependence on the processing time of the second communication device, the selected frame structure having a corresponding feedback timing requirement that is compatible with the processing time of the second communication device, and in further dependence on a timing advance with respect to the second communication device, such that the processing time plus the timing advance do not violate the corresponding feedback timing requirement of the selected frame structure;

transmit, via the transceiver, an indication of the selected frame structure to the second communication device; and communicate with the second communication device via the transceiver, in accordance with the selected frame structure, including receiving feedback from the second communication device according to the selected frame structure.

5. The first communication device of claim 4, wherein the processing circuitry is configured to select the frame structure in further dependence on a communication configuration used for communications between the first communication device and the second communication device.

6. The first communication device of claim 4, wherein the second communication device is a user equipment and the first communication device is a base station of the wireless communication network.

7. A method implemented by a second communication device operating in a wireless communication network, the method comprising:

generating a message comprising capability information indicating a processing time of the second communication device, the processing time bearing on the generation of feedback at the second communication device for transmission to a first communication device of the wireless communication network; and transmitting the message to the first communication device, for use by the first communication device in selecting a frame structure to be used for communications between the first communication device and the second communication device, the selected frame structure having a corresponding feedback timing requirement that is compatible with the processing time of the second communication device and that is not violated by the processing time plus a timing advance with respect to the first communication device;

receiving an indication of the selected frame structure from the first communication device; and communicating with the first communication device in accordance with the selected frame structure, including transmitting feedback from the second communication device according to the selected frame structure.

8. A second communication device configured for operation in a wireless communication network, the second communication device comprising:

a transceiver; and processing circuitry configured to:

generate a message comprising capability information indicating a processing time of the second communication device, the processing time bearing on the generation of feedback at the second communication device for transmission to a first communication device of the wireless communication network; and transmit, via the transceiver, the message to the first communication device, for use by the first communication device in selecting a frame structure to be used for communications between the first communication device and the second communication device, the selected frame structure having a corresponding feedback timing requirement that is compatible with the processing time of the second communication device and that is not violated by the processing time plus a timing advance with respect to the first communication device;

receive, via the transceiver, an indication of the selected frame structure from the first communication device; and communicate with the first communication device via the transceiver, in accordance with the selected frame structure, including transmitting feedback from the second communication device according to the selected frame structure.

* * * * *

UNITED STATES PATENT AND TRADEMARK OFFICE
CERTIFICATE OF CORRECTION

| | |
|---|---|
| PATENT NO. | : 10,348,472 B2 |
| APPLICATION NO. | : 15/837789 |
| DATED | : July 9, 2019 |
| INVENTOR(S) | : Miao et al. |

Page 1 of 1

It is certified that error appears in the above-identified patent and that said Letters Patent is hereby corrected as shown below:

In the Specification

In Column 4, Line 8, delete "disclosure:" and insert -- disclosure; --, therefor.

In Column 8, Line 62, delete "example. Table" and insert -- example, Table --, therefor.

In Column 11, Line 44, delete "also communication" and insert -- also communicate --, therefor.

In Column 13, Line 1, delete "TB sizes. MIMO layers. MCSs." and insert -- TB sizes, MIMO layers, MCSs, --, therefor.

In Column 16, Line 8, delete "(ASSPs)." and insert -- (ASSPs), --, therefor.

In Column 16, Line 24, delete "memory 910" and insert -- memory 920 --, therefor.

In Column 16, Line 48, delete "memory 910" and insert -- memory 920 --, therefor.

In Column 16, Line 51, delete "memory 910" and insert -- memory 920 --, therefor.

In Column 16, Line 57, delete "memory 910" and insert -- memory 920 --, therefor.

Signed and Sealed this
Tenth Day of September, 2019

Andrei Iancu
*Director of the United States Patent and Trademark Office*